US009963062B1

(12) United States Patent
Halls (10) Patent No.: US 9,963,062 B1
(45) Date of Patent: May 8, 2018

(54) REMOVABLE ANCHOR (71) Applicant: Alan Halls, Lehi, UT (US)

(72) Inventor: Alan Halls, Lehi, UT (US)

(73) Assignee: Alan Halls, Lehi, UT (US)

( * ) Notice: Subject to any disclaimer, the term of this patent is extended or adjusted under 35 U.S.C. 154(b) by 0 days. days.

(21) Appl. No.: 15/594,741

(22) Filed: May 15, 2017

(51) Int. Cl.
*B60P 7/08* (2006.01)

(52) U.S. Cl.
CPC .................. *B60P 7/0807* (2013.01)

(58) Field of Classification Search
CPC ........ B60P 7/0807; B60P 7/08; B61D 45/001; E05B 73/0005
USPC .... 410/101, 102, 106, 110, 116; 24/265 CD, 24/115 K
See application file for complete search history.

(56) References Cited

U.S. PATENT DOCUMENTS

| 2,685,848 | A | * | 8/1954 | Meighan | ................. | B63B 25/24 |
| | | | | | | 410/116 |
| 6,142,718 | A | * | 11/2000 | Kroll | ..................... | B60P 7/0807 |
| | | | | | | 410/101 |
| 2013/0309038 | A1 | * | 11/2013 | Starr | ..................... | B60P 7/0807 |
| | | | | | | 410/106 |

\* cited by examiner

*Primary Examiner* — Stephen Gordon

(57) ABSTRACT

A removable anchor assembly is disclosed. In embodiments, the removable anchor assembly includes an anchor and a locking plate. The anchor includes a shaft with a head at a proximal end and a keyway shaft at a distal end. The anchor further includes a fixed washer, a compressible gasket configured to compress along a length of the shaft, and a slideable washer configured to move along the length of the shaft. The anchor also includes a t-lock formed in the keyway shaft. The locking plate includes a distal face and forms a locking-plate hole through the locking plate, a t-lock channel through the locking plate, and a recess formed in the distal face, the recess oriented perpendicular to the the t-lock channel and configured to secure the t-lock from rotating when the t-lock rests in the recess.

12 Claims, 8 Drawing Sheets

REMOVABLE ANCHOR

TECHNICAL FIELD

The present disclosure relates to a removable anchor system for purposes of securing cargo for transportation.

BACKGROUND

Existing methods exist for securing cargo for transport. However, these methods require attaching additional items to the top surface of a cargo deck, such as in published patent application EP 1998/0305978 and U.S. Pat. No. 2,688,289. Other methods, as in U.S. Patent Application Publication 2006/0133907, include countersinking an anchor into the deck. The system requires the removal of a substantial amount of material from the deck, which weakens the anchor connection. Other removable anchor systems involve adding tracks to the deck, which reduces the usable space of the cargo area, creates a tripping hazard, or makes the deck more difficult to clean.

SUMMARY

The applicant of the present disclosure identified a new anchor assembly and method which provides a simple 90-degree twist lock or threaded removable anchoring system. A removable anchoring system described herein can withstand substantial forces while leaving the surface of the cargo area level for easy cleanup and usage when needed. In addition, the present disclosure, in aspects and embodiments, describes a design which is removable without special tools, is repositionable to fit the needs of various cargo situations, and is easily storable when not in use.

A removable anchoring method has practical applications in automotive, trailering, moving vans, freight, shipping, industrial, and more. A common issue that could benefit from an anchor assembly is tying cargo into a trailer to prevent sliding, tipping, or bouncing. Typically, the directional forces allowed by tying to only the sides of trailer are insufficient. By adding a variety of anchor points in the middle of the trailer bed, directional forces are maximized in the most beneficial way.

Additionally, when loading a moving truck, it is common that the walls which would provide anchor points for furniture may be blocked, while still having additional items that need to be secured. However, installing a traditional tie-down, even a recessed one, may be inadvisable as it can create high likelihood of scratching, tearing, or otherwise damaging items in transit. Having a selection of removable anchors can maximize an operator's ability to move furniture or cargo safely and without damage.

All-terrain vehicle (ATV) enthusiasts commonly have specialized racks mounted in their trailers. Utilizing this anchoring system, those racks could be added and removed without specialized tools making the operator's trailers much more versatile for uses other than hauling ATV equipment.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION

The present disclosure covers apparatuses and associated methods for a removable anchoring device. In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. Thus, the following more detailed description of the embodiments of the present invention, as illustrated in some aspects in the drawings, is not intended to limit the scope of the invention, but is merely representative of the various embodiments of the invention.

In this specification and the claims that follow, singular forms such as "a," "an," and "the" include plural forms unless the content clearly dictates otherwise. All ranges disclosed herein include, unless specifically indicated, all endpoints and intermediate values. In addition, "optional," "optionally," or "or" refer, for example, to instances in which subsequently described circumstance may or may not occur, and include instances in which the circumstance occurs and instances in which the circumstance does not occur. The terms "one or more" and "at least one" refer, for example, to instances in which one of the subsequently described circumstances occurs, and to instances in which more than one of the subsequently described circumstances occurs.

The present disclosure covers methods, materials, compositions, assemblies, and kits for the creation of a removable anchor that can maintain the structural integrity of the material of a cargo deck or truck bed through minimal removal of the material.

Figures 1A, 1B:
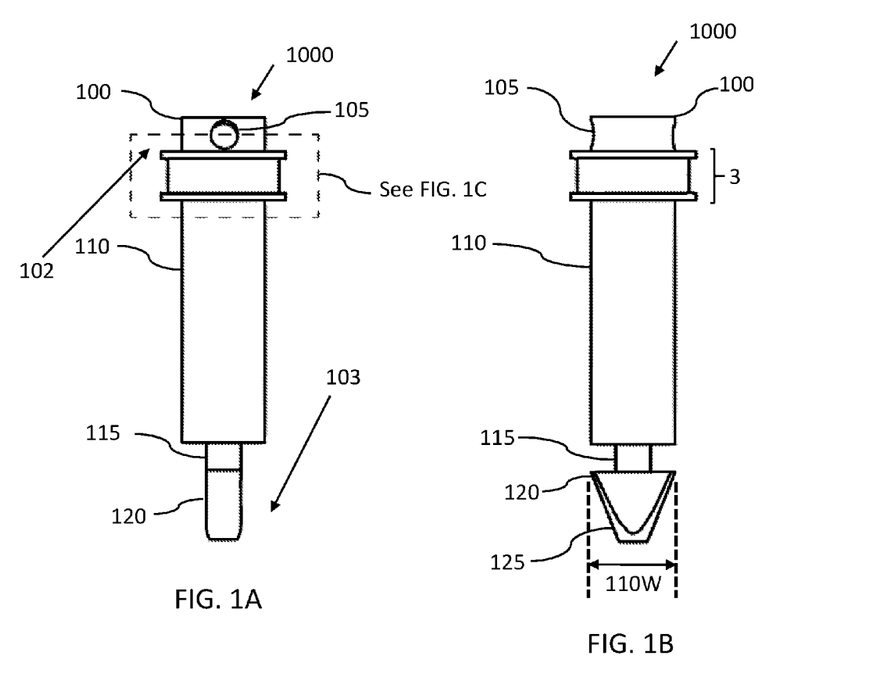
FIG. 1A illustrates a side view of an anchor.
FIG. 1B illustrates the anchor of FIG. 1A from the front.

FIGS. 1A and 1B illustrate a side and front view of an anchor 1000. The anchor 1000 comprises a shaft 110 having a head 100 at a proximal end 102 and a keyway shaft 115 at a distal end 103. In this embodiment, the head 100 forms a ring-hole 105. The ring-hole 105 may be configured to hold a ring (not shown in FIG. 1A or 1B).

Figure 1C:
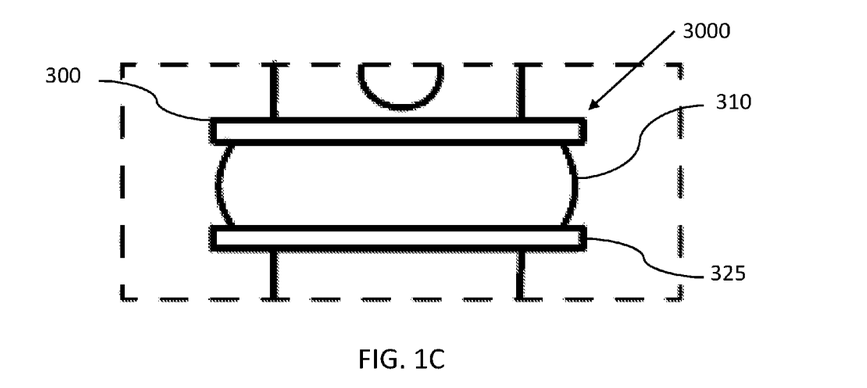
FIG. 1C is a detail view of a compression assembly of the anchor in FIG. 1A.

FIG. 1C is a detail view of a compression assembly 3000 of the anchor in FIG. 1A. Referring to FIGS. 1A, 1B, and 1C, the anchor 1000 further comprises a fixed washer 300, which surrounds and is fixed to the shaft 110. In this embodiment, the fixed washer 300 is held fixed to the shaft 110 towards the distal end 103 of the ring-hole 105. In this embodiment, the fixed washer 300 is next to but does not obstruct access to the ring-hole 105.

The anchor 1000 further comprises a compressible gasket 310, which also surrounds the shaft 110 and is coupled to the side of the fixed washer 300 towards the shaft's 110 distal end 103. The side of the compressible gasket 310 that is against the fixed washer 300 may be glued, welded, melted and then re-solidified, dissolved through a solvent and then re-cured, or otherwise attached or bonded to the fixed washer 300. Alternatively, the compressible gasket 310 may not be permanently fixed to the fixed washer 300.

The compressible gasket 310 is configured to compress along the length of the shaft 110. A compressible gasket may be made of rubber, plastic, foam, a spring, or any other compressible material.

The anchor 1000 further comprises a slideable washer 325 configured to move along the length of the shaft 110, and coupled to the side of the compressible gasket 310 towards the shaft's 110 distal end.

Referring again to the compression assembly 3000 in FIG. 1C, the compressible gasket 310 is shown compressed when a force is applied from the distal side of slideable washer 325 towards the proximal end 103 of shaft 110. In embodiments, the compressible gasket 310 may be configured to compress as much as 20%, 30%, 40%, or 50% when a force of only a few pounds is applied to the slideable washer 325. The force necessary to compress compressible gasket 310 may be capable of being applied by a single hand of an operator.

Referring back to FIGS. 1A and 1B, the anchor 1000 further comprises a t-lock 120 formed into a keyway shaft 115. The keyway shaft 120 may have a guiding taper 125. In embodiments, the head 100, shaft 110, keyway shaft 115, and t-lock 120 may be forged from a single, solid piece of steel or other metal.

Figure 2A:
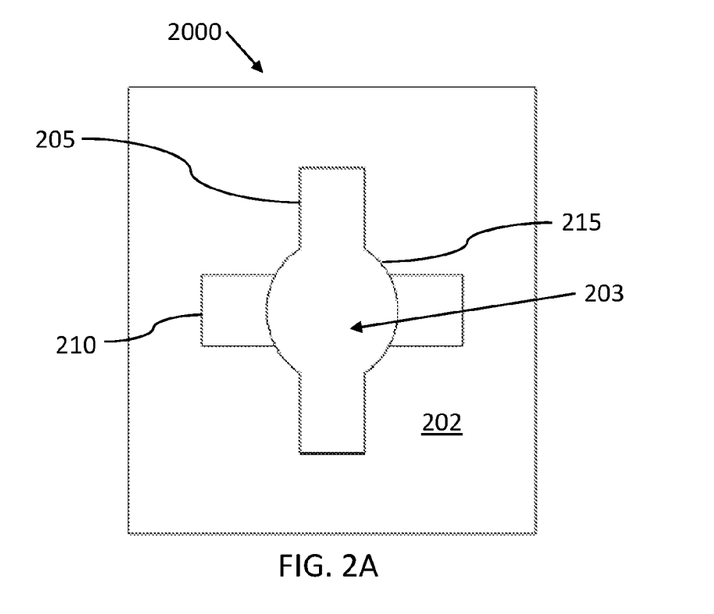
FIG. 2A illustrates a top view of a locking plate.
Figure 2B:
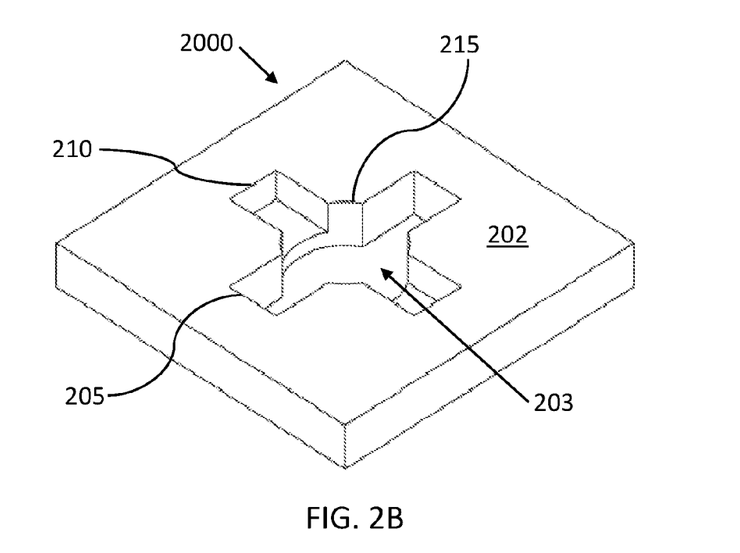
FIG. 2B illustrates an isometric view of the locking plate of FIG. 2A.

FIGS. 2A and 2B illustrate a locking plate 2000 with a distal face 202. The locking plate 2000 forms a locking plate hole 203 that extends through the locking plate 2000. The locking plate hole 203 is sized to receive the keyway shaft 120. The locking plate hole 203 may also include sides 215 shaped to receive the keyway shaft 120. In this embodiment, the keyway shaft 120 is circular so the sides 215 of the locking plate hole 203 are rounded to fit the keyway shaft 120.

The locking plate 2000 further comprises a t-lock channel 205 that also extends through the locking plate 2000. The t-lock channel 205 is centered on the locking-plate hole 203 and sized to pass the t-lock 120 therethrough.

The locking plate 2000 further comprises a recess 210 formed in the distal face 202. The recess 210 is oriented perpendicular to the t-lock channel 205 and configured to secure the t-lock 120 from rotating when the t-lock 120 rests in the recess 210.

Figures 3, 4:
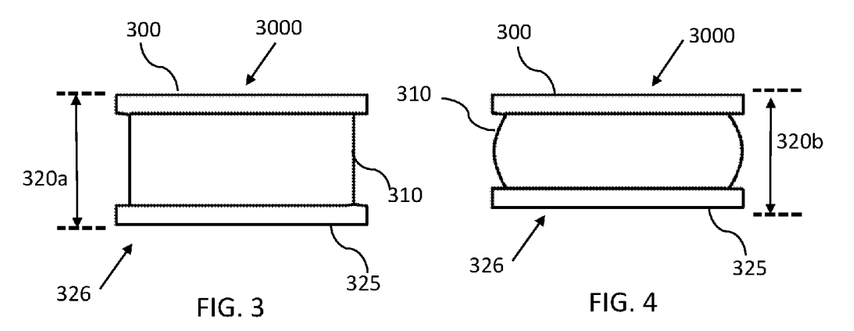
FIG. 3 illustrates a compression assembly including a fixed washer, compressible gasket, and a slideable washer.
FIG. 4 illustrates the assembly shown in FIG. 3, compressed.

FIG. 3 illustrates compression assembling 3000, and includes a fixed washer 300, a comprisable gasket 310, and a slideable washer 325. FIG. 4 illustrates the compressible assembly 3 shown in FIG. 3, compressed. Referring again to detail FIG. 1C and FIG. 4, the compressible gasket 310 is shown compressed when a force is applied from the distal side 325 of slideable washer 325, i.e, towards the proximal end 103 of shaft 110 shown in FIGS. 1A and 1B.

FIG. 3 shows compressible gasket 310 at its fully extended width 320a. FIG. 4 shows compressible gasket 310 at its compressed width 320b. In embodiments, the compressible gasket 310 may be configured to compress as much as 20%, 30%, 40%, or 50% when a force of only a few pounds is applied to the distal side 326 of slideable washer 325. The compressible distance, or the difference between the extended width 320a and compressed width 320b should be as much as the depth of the recess 210 illustrated in FIGS. 2A and 2B. The force necessary to compress compressible gasket 310 may be capable of being applied by a single hand of an operator securing anchor 1000, for example, to a cargo deck (not shown).

Figures 5, 6:
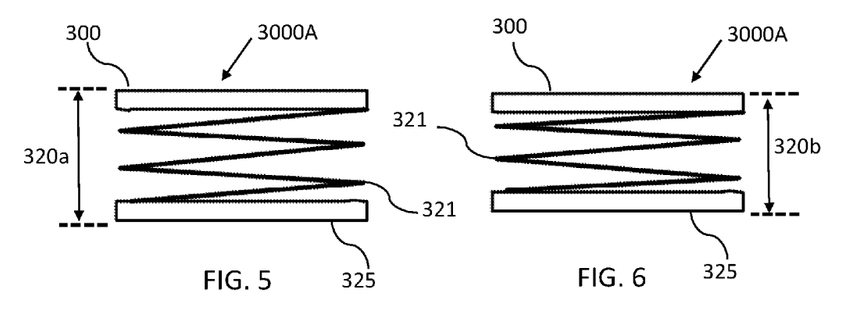
FIG. 5 illustrates a fixed washer, spring, and slideable washer assembly.
FIG. 6 illustrates the assembly shown in FIG. 5, compressed.

FIGS. 5 and 6 illustrate alternate embodiments of a compression assembly 3000A. In these embodiments, a compressible gasket has been replaced with a spring 321. FIG. 5 illustrates the coil spring 321 in its fully extended width 320 a. FIG. 6 illustrates the the coil spring 321 in is compressed width 320b. A coil spring 321 may be less expensive than a compressible gasket 310 but may be more difficult to attach to fixed washer 300. A coil spring 321 may also be susceptible to corrosion or having debris lodged in it coils making it more difficult to compress and thus secure an anchor, for example, to a cargo deck (not shown).

Figure 7A:
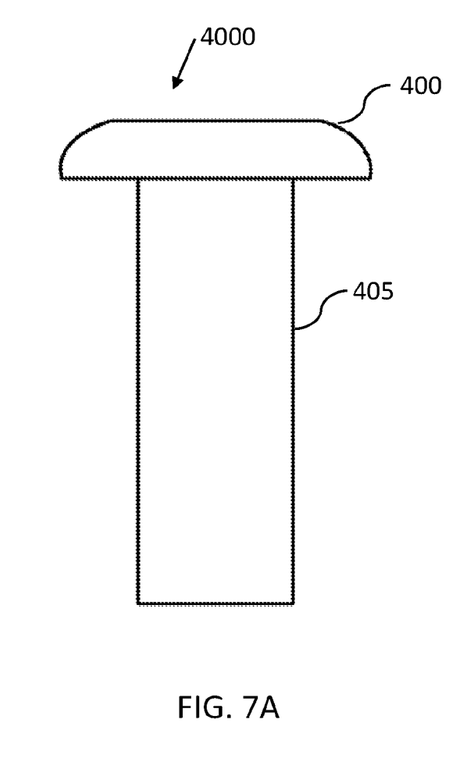
FIG. 7A illustrates an elevation view of a protection sleeve.
Figure 7B:
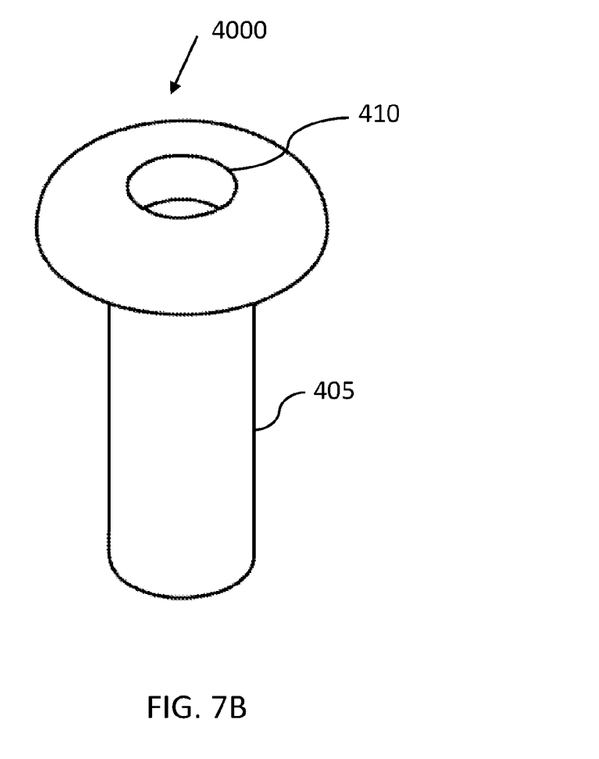
FIG. 7B illustrates an isometric view of the protection sleeve of FIG. 7A.

FIGS. 7A and 7B illustrate a protection sleeve 4000 with a protection sleeve head 400 forming a hole 410, the hole 410 extending down a cylinder 405. Protection sleeve 4000 may be inserted into a hole formed, for example, in a cargo deck, to protect the cargo deck from normal wear and tear that may be associated with installing and using or removing an anchor assembly.

Figure 8:
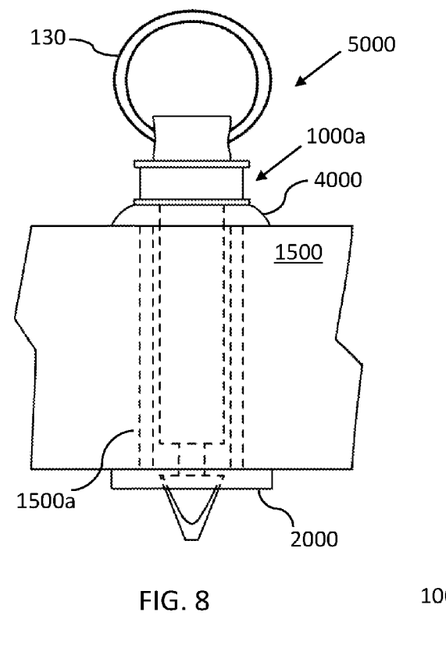
FIG. 8 illustrates an anchor assembly inserted and secured to a deck.
Figure 9:
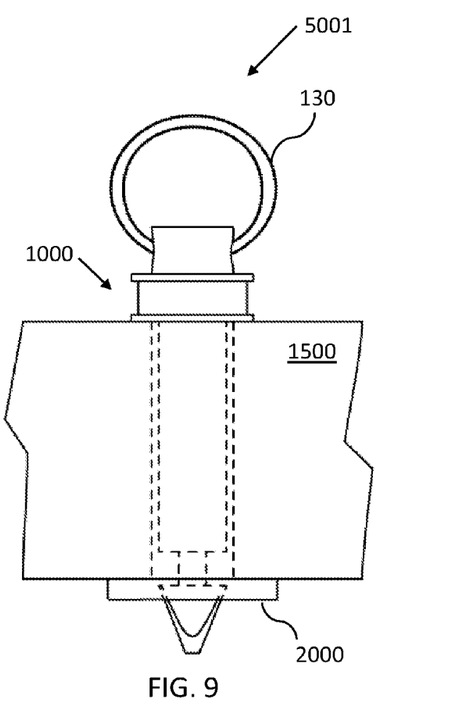
FIG. 9 illustrates another anchor assembly inserted and secured to a deck.

FIGS. 8 and 9 illustrate two embodiments of anchor assemblies 5000 and 5001 inserted and secured, for example, to a cargo deck 1500. The anchor assemblies 5000 and 5001 include a ring 130 that may be used to attach a rope or other line (not shown) which secures a load (not shown) to the cargo deck. Anchor assembly 5000 further includes protection sleeve 4000 inserted through a portion of the deck 1500.

FIGS. 8 and 9 illustrate anchor assemblies 5000 and 5001 with their respective locking plates 2000 secured to the opposite side of a deck 1500 or cargo-hold wall (not shown). The locking plates 2000 provide a means for securing the anchors 1000a and 1000 to the deck 1500 such that the deck 1500 is not damaged when the anchor assemblies 5000 and 5001 are inserted, used, or removed from the deck 1500. The locking plates 2000 also distribute uniformly through the deck 1500 any load pulling on the ring 130.

Referring to FIGS. 1A, 1B, 2A, 2B, 8, and 9, an anchor assembly 5000 or 5001 may be secured to a deck 1500 by inserting an anchor 1000a or 1000 through a hole 1500 of the deck 1500 and through locking plate 2000. The head 100 of the anchor 1000 may be pressed against the surface of the deck 1500 such that compressible gasket 310 is compressed, allowing the length of the t-lock 120 to extend through the keyway shaft 105 beyond the distal face 202 of the locking plate 2000. Once the t-lock 120 is extended beyond the distal face 202 of the locking plate 2000, the anchor 1000a or 1000 may be rotated 90 degrees (clockwise or counter-clockwise) and the t-lock 120 may be retracted slightly by the expansion force of the compressible gasket 310 to be secured into recess 210. Thus positioned or secured, the t-lock 120 and anchor 1000a or 1000, may be prevented by the compressible gasket 310 and the shape of the recess 210 from rotating outside the recess 210 and slipping out of the hole 1500a of the deck 1500.

When anchor assembly 5000 or 5001 is in use, or when a tension force (not shown) is applied to ring 130, the tension force (not shown) further secures t-lock 120 inside recess 210 and prevents the t-lock 120 from rotating outside of recess 210.

Referring back to FIG. 1B and FIGS. 8 and 9, the t-lock 120 has a width 110W equal to the diameter of the shaft 110 (not labeled). Matching the width 110W to the diameter of the shaft 110 (not labeled), combined with the guiding taper 125, helps guide the shaft 110 through the deck hole 1500a and helps prevent excessive vibration or movement of the anchor assembly 5000 or 5001 once inserted through the deck hole 1500a, thus preventing premature release of the anchor assembly 5000 or 5001 from the deck 1500.

The length and diameter of head 100, shaft 110, and keyway shaft 115 may be varied to account for a variety of material thicknesses of deck 1500 and loading requirements imposed on the anchor 1000 through ring 130. For example, a tension load on the ring 130 may be as much as 3,000 lbs or even as high as 10,000 lbs.

Similarly, the size and thickness of locking plate 2000 may be varied to account for the various types of loads that may be imposed on the anchor 1000 and the type of material of the deck 1500.

Figure 10A:
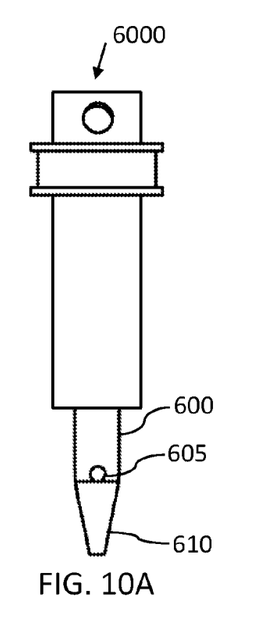
FIG. 10A illustrates a side view of an anchor.
Figure 10B:
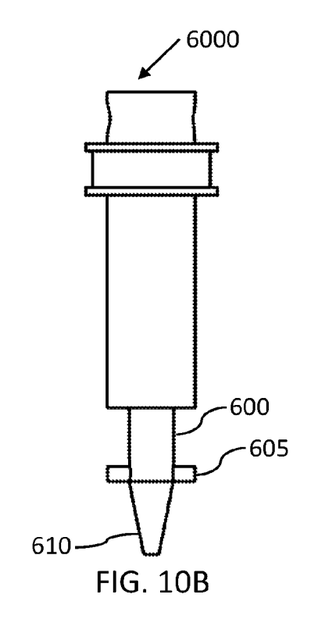
FIG. 10B illustrates the anchor of FIG. 10A from the front.

FIGS. 10A and 10B illustrate the side and front view of another anchor 6000. In these embodiments, the anchor 6000 includes a keyway shaft 600 and a locking pin 605 that is inserted through the keyway shaft 600. Keyway shaft 600 also includes a guiding taper 610 that is configured to guide keyway shaft 600 through, for example, a deck (like deck 1500 shown in FIGS. 8 and 9) and a locking plate.

Figure 11A:
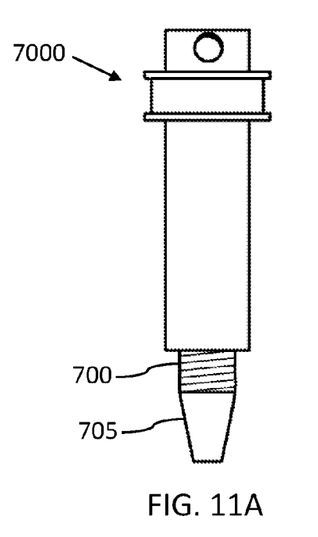
FIG. 11A illustrates a side view of another anchor.
Figure 11B:
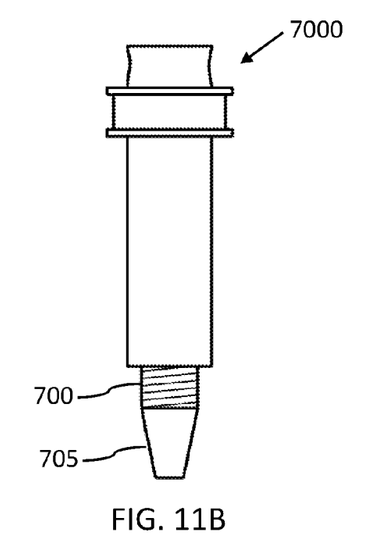
FIG. 11B illustrates the anchor of FIG. 11A from the front.

FIGS. 11A and 11B illustrate the side and front views of another anchor 7000. In this embodiment, the anchor 7000 includes a screw 700 and a guiding taper 705. The screw 700 is configured to screw into the threads (not shown) of a locking plate.

Figure 12A:
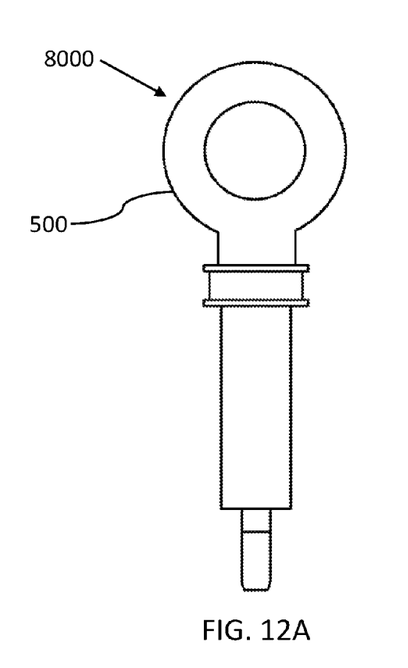
FIG. 12A illustrates a side view of another anchor.
Figure 12B:
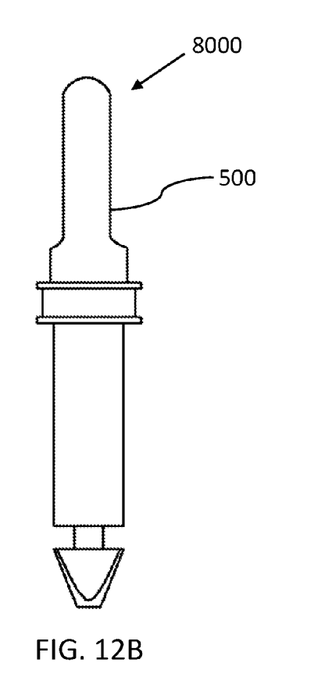
FIG. 12B illustrates the anchor of FIG. 12A from the front.

FIGS. 12A and 12B illustrate the side and front view of another anchor 8000. In this embodiment, a ring 500 is forged as part of the head (not labeled) of the anchor 8000.

Figure 13A:
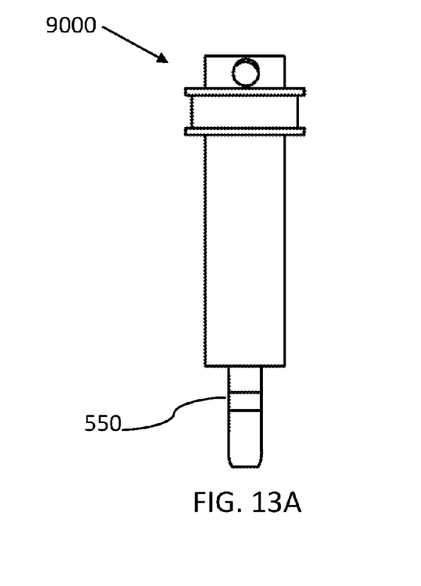
FIG. 13A illustrates a side view of another anchor.
Figure 13B:
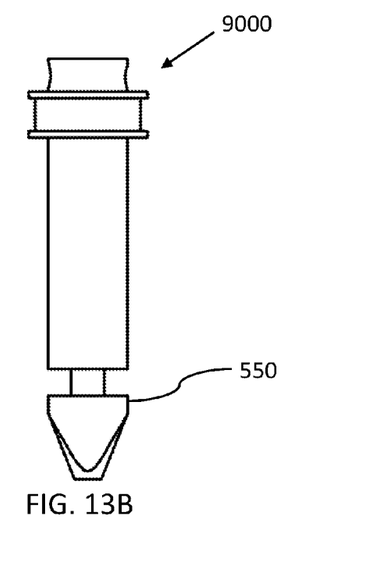
FIG. 13B illustrates the anchor of FIG. 13A from the front.

FIGS. 13A and 13B illustrate the side and front view of another anchor 9000. In this embodiment, the t-lock 550 includes additional material which provides more surface area for the t-lock 550 to be secured to the sides of a recess, for example, recess 210 shown in FIGS. 2A and 2B.

Figure 14A:
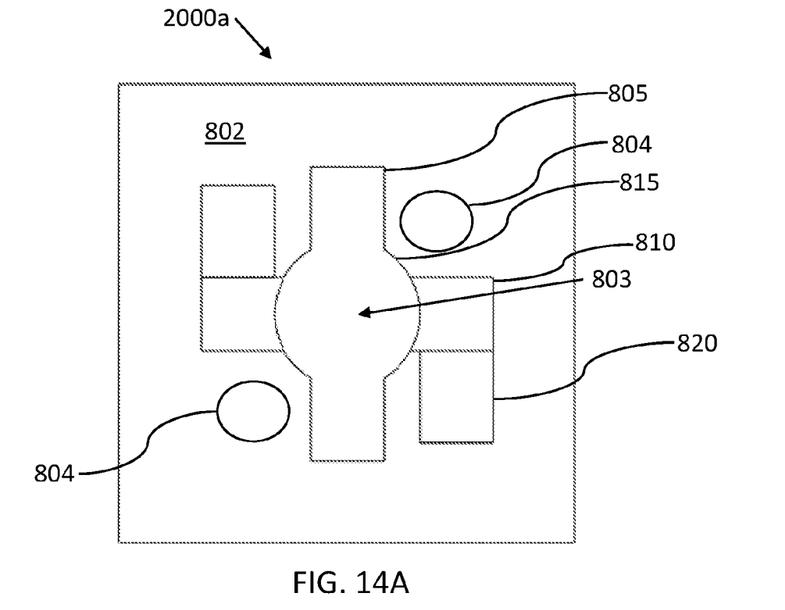
FIG. 14A illustrates a top view of another locking plate.
Figure 14B:
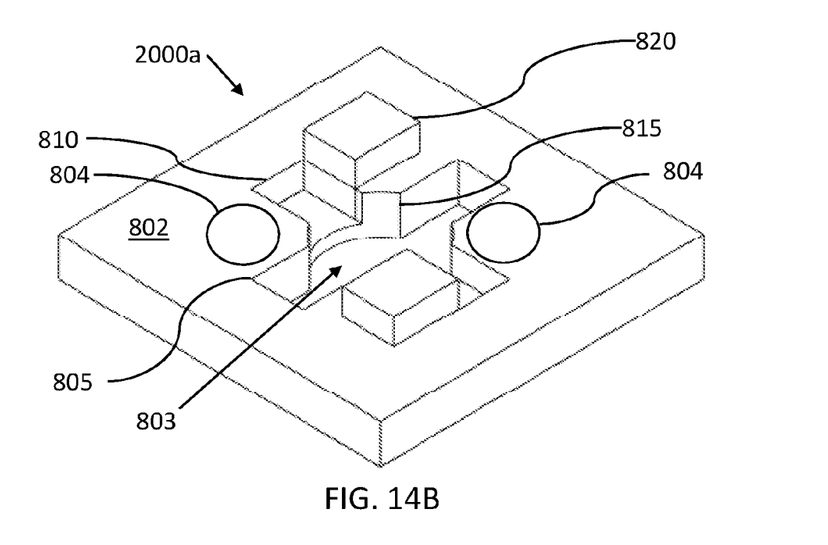
FIG. 14B illustrates an isometric view of the locking plate of FIG. 14A.

FIGS. 14A and 14B illustrate another embodiment of a locking plate 2000a. Locking plate 2000a includes a distal face 802 and forms a locking plate hole 803 that extends through the locking plate 2000a. The locking plate hole 803 is sized to receive the keyway shaft 120. The locking plate hole 803 may also include sides 815 shaped to receive the keyway shaft 120. In this embodiment, the keyway shaft 120 is circular so the sides 815 of the locking plate hole 803 are rounded to fit the keyway shaft 120.

In embodiments, locking plate 2000a further includes a t-lock channel 805 that also extends through the locking plate 2000a. The t-lock channel 805 is centered on the locking-plate hole 803 and sized to pass the t-lock 120 therethrough.

In embodiments, locking plate 2000a further includes a recess 810 formed in the distal face 802. The recess 810 is oriented perpendicular to the t-lock channel 805 and configured to secure the t-lock 120 from rotating when the t-lock 120 rests in the recess 810.

In embodiments, locking plate 2000a also includes a knob or ramp 804. The knob or ramp provides an additional outcropping of material from the locking plate face 802 for which a t-lock, such as t-lock 120, must pass over to slide into recess 810. The knob or ramp 804 helps to prevent a t-lock from vibrating out of the recess 810.

In embodiments, locking plate 2000a further includes rotation locks 820. Rotation locks 820 are blocks or other material attached to the distal face 802. Rotation locks 820 are configured to guide a t-lock, such as t-lock 120, into recess 810 by preventing the t-lock 120 from rotating more than 90-degrees after being inserted through t-lock channel 805. In this embodiment, a t-lock, such as t-lock 120 must be rotated counter-clockwise, when looking towards the distal end, to secure the t-lock in place, and clock-wise, again when looking towards the distal end, to release the t-lock from recess 810 and out of the t-lock channel 805.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

I claim:

1. An anchor assembly, comprising:
   an anchor, the anchor comprising:
   a shaft having a head at a proximal end and a keyway shaft at a distal end, the head forming a ring-hole, the ring-hole configured to hold a ring;
   a fixed washer surrounding and fixed to the shaft adjacent a side of the hole that is towards the shaft's distal end;
   a compressible gasket surrounding the shaft, configured to compress along a length of the shaft, and coupled to a side of the fixed washer towards the shaft's distal end;
   a slideable washer surrounding the shaft, configured to move along the length of the shaft, and coupled to a side of the compressible gasket towards the shaft's distal end; and
   a t-lock formed in the keyway shaft; and
   a locking plate, the locking plate comprising:
   a distal face forming
   a locking-plate hole through the locking plate, the locking-plate hole sized to receive the keyway shaft; and
   a t-lock channel through the locking plate, the t-lock channel centered on the locking-plate hole and sized to pass the t-lock therethrough; and a recess formed in the distal face, the recess oriented perpendicular to the the t-lock channel and configured to secure the t-lock from rotating when the t-lock rests in the recess.

2. The anchor assembly of claim 1, wherein the compressible gasket is configured to compress at least a depth of the recess.

3. The anchor assembly of claim 1, wherein the keyway shaft further comprises a tapered surface configured to guide the keyway shaft through the locking-plate hole and t-lock channel.

4. The anchor assembly of claim 1, wherein:
the keyway shaft is configured to pass through a trailer deck hole formed in a trailer deck;
the locking plate is configured to attach to an underside of the trailer deck;
the compressible gasket is configured to:
compress the trailer deck and the locking plate;
secure the t-lock in the recess when the t-lock is aligned with the recess; and
provide a recoil force between the trailer deck and the anchor assembly that secures the anchor assembly against the trailer deck.

5. The anchor assembly of claim 1, wherein the fixed washer is milled as continuous part of the head and shaft.

6. The anchor assembly of claim 1, further comprising a milled shoulder between the fixed washer and the head, the milled shoulder configured to secure the fixed washer to the shaft.

7. The anchor assembly of claim 1, wherein the compressible gasket is a coil spring with one end of the coil spring attached to the fixed washer and another end of the coil spring attached to the slideable washer.

8. The anchor assembly of claim 1, wherein the t-lock is milled as a continuous piece of the keyway shaft.

9. The anchor assembly of claim 1, wherein the t-lock is a pin passing through a keyway shaft hole formed in the keyway shaft, the pin extending away from and perpendicular to the keyway shaft.

10. The anchor assembly of claim 1, wherein the keyway shaft comprises a tapered surface and a threaded keyway surface, the tapered surface configured to guide the keyway shaft through the locking-plate hole and the threaded keyway surface is configured to screw into a mating locking-plate threaded surface.

11. The anchor assembly of claim 1, wherein the shaft head and fixed washer are milled as a continuous, monolithic piece of the keyway shaft.

12. A method of anchoring a load, comprising:
providing an anchor assembly, the anchor assembly comprising:
an anchor, the anchor comprising:
a shaft having a head at a proximal end and a keyway shaft at a distal end, the head forming a ring-hole, the ring-hole configured to hold a ring;
a fixed washer surrounding and fixed to the shaft adjacent a side of the hole that is towards the shaft's distal end;
a compressible gasket surrounding the shaft, configured to compress along a length of the shaft, and coupled to a side of the fixed washer towards the shaft's distal end;
a slideable washer surrounding the shaft, configured to move along the length of the shaft, and coupled to a side of the compressible gasket towards the shaft's distal end; and
a t-lock formed in the keyway shaft; and
a locking plate, the locking plate comprising:
a distal face forming
a locking-plate hole through the locking plate, the locking-plate hole sized to receive the keyway shaft; and
a t-lock channel through the locking plate, the t-lock channel centered on the locking-plate hole and sized to pass the t-lock therethrough; and
a recess formed in the distal face, the recess oriented perpendicular to the the t-lock channel and configured to secure the t-lock from rotating when the t-lock rests in the recess; and
securing a load to the anchor assembly.

* * * * *